(12) United States Patent
Iwashita

(10) Patent No.: US 7,506,708 B2
(45) Date of Patent: Mar. 24, 2009

(54) APPARATUS FOR PROTECTING A HIGH-VOLTAGE WIRE IN AN ELECTRIC VEHICLE

(75) Inventor: Kanau Iwashita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 591 days.

(21) Appl. No.: 11/175,658

(22) Filed: Jul. 6, 2005

(65) Prior Publication Data

US 2006/0037801 A1    Feb. 23, 2006

(30) Foreign Application Priority Data

Aug. 19, 2004    (JP)    ............... 2004-239415

(51) Int. Cl.
*B60K 1/00*    (2006.01)
(52) U.S. Cl. ............... 180/65.1; 180/65.5; 180/65.6; 180/220
(58) Field of Classification Search ............. 180/65.1, 180/65.5, 65.6, 65.8, 220, 908
See application file for complete search history.

(56) References Cited

U.S. PATENT DOCUMENTS

| | | | | |
|---|---|---|---|---|
| 5,421,427 A * | 6/1995 | Ogawa et al. | ............... | 180/220 |
| 5,517,072 A * | 5/1996 | Hildebrandt | ............... | 310/228 |
| 5,524,726 A * | 6/1996 | Wright, Jr. | ............... | 180/220 |
| 5,678,760 A * | 10/1997 | Muso et al. | ............... | 237/2 A |
| 5,818,134 A * | 10/1998 | Yang et al. | ............... | 310/78 |
| 5,853,059 A * | 12/1998 | Goertzen et al. | ............... | 180/65.6 |
| 5,960,901 A * | 10/1999 | Hanagan | ............... | 180/210 |
| 6,176,338 B1 * | 1/2001 | Nakagawa et al. | ............... | 180/219 |
| 6,199,651 B1 * | 3/2001 | Gay | ............... | 180/220 |
| 6,217,051 B1 * | 4/2001 | Nakagawa et al. | ............... | 280/303 |
| 6,321,863 B1 * | 11/2001 | Vanjani | ............... | 180/65.5 |
| 6,568,496 B1 * | 5/2003 | Huang | ............... | 180/220 |
| 6,640,922 B2 * | 11/2003 | Nakagawa | ............... | 180/227 |
| 6,679,345 B2 * | 1/2004 | Hirayama et al. | ............... | 180/65.3 |
| 6,761,241 B2 * | 7/2004 | Kohda | ............... | 180/219 |
| 6,822,353 B2 * | 11/2004 | Koga et al. | ............... | 310/64 |
| 6,889,788 B2 * | 5/2005 | Hakamata et al. | ............... | 180/219 |
| 6,892,841 B2 * | 5/2005 | Makuta et al. | ............... | 180/65.5 |
| 6,946,762 B2 * | 9/2005 | Rinholm et al. | ............... | 310/66 |
| 7,017,694 B2 * | 3/2006 | Shirazawa | ............... | 180/65.5 |

(Continued)

FOREIGN PATENT DOCUMENTS

JP    2004-122981    4/2004

*Primary Examiner*—Christopher P Ellis
*Assistant Examiner*—Vaughn T Coolman
(74) *Attorney, Agent, or Firm*—Carrier Blackman & Associates, P.C.; William D. Blackman; Joseph P. Carrier

(57) ABSTRACT

A protective guard member is provided in order to protect a high-voltage wire connected to a control unit in an electric vehicle, in which the control unit, for controlling a drive motor of the vehicle, is mounted to a rear swing arm thereof. The high-voltage wire protecting guard member may be provided as a guard arm of a main vehicle support stand, arranged to shield the external side of the high-voltage wire, when the support stand is in a stored position thereof. The guard arm may be configured to protectively shield a water supply pipe and a water discharge pipe for a cooling plate associated with the control unit, as well as protecting the high-voltage wire, when the support stand is in the stored position thereof.

20 Claims, 8 Drawing Sheets

U.S. PATENT DOCUMENTS

| | | | |
|---|---|---|---|
| 7,117,966 B2 * | 10/2006 | Kohda et al. | 180/68.5 |
| 7,210,550 B2 * | 5/2007 | Yonehana et al. | 180/220 |
| 7,249,644 B2 * | 7/2007 | Honda et al. | 180/65.5 |
| 2003/0221887 A1 * | 12/2003 | Hsu | 180/180 |
| 2004/0079574 A1 * | 4/2004 | Ono et al. | 180/252 |
| 2006/0037793 A1 * | 2/2006 | Horii et al. | 180/89.2 |
| 2006/0267436 A1 * | 11/2006 | Naito et al. | 310/156.32 |

* cited by examiner

US 7,506,708 B2

APPARATUS FOR PROTECTING A HIGH-VOLTAGE WIRE IN AN ELECTRIC VEHICLE

CROSS-REFERENCE TO RELATED APPLICATIONS

The present application claims priority under 35 USC 119 based on Japanese patent application No. 2004-239415, filed Aug. 19, 2004, the complete disclosure of which is incorporated herein by reference.

BACKGROUND OF THE INVENTION

1. Technical Field

The present invention relates to a structure for protecting high-voltage wires on an electric vehicle, used for supplying electric power to a motor of the electric vehicle.

2. Description of the Background Art

In certain electric vehicles such as, for example, a motorcycle, an electric motor has been used as the driving source of the vehicle, and a control unit, for controlling drive operation of the motor, has been provided on a rear swing arm which is swingably mounted to a vehicle body frame. Such a design for mounting a drive motor and control unit is disclosed in Japanese Patent Application Laid Open No. 2004-122981. In the electric vehicle described in this reference, the control unit is connected to a battery, mounted to the vehicle body frame, and having high-voltage wires extending to the motor.

A high-voltage wire in the arrangement described above is usually protected by a portion of the rear swing arm, such as a cover member. However, there is still a need for an improved design of the rear swing arm that reduces the overall weight of the electric vehicle, while further improving protection for the high-voltage wires.

The present invention has been developed based on the foregoing background, and it is an object of the present invention to provide an improved structure for protecting the high-voltage wires, designed sensibly, for an electric vehicle in which a control unit for controlling the motor to drive the vehicle is mounted on a rear swing arm.

SUMMARY OF THE INVENTION

To attain the above object, a first aspect of the present invention provides a protective structure for covering placement over high-voltage wiring in an electric vehicle. The electric vehicle includes an electric motor as a drive source, and one or more batteries, as a vehicle power source for supplying electric power to the motor. The electric vehicle also includes a control unit for controlling operation of the motor on the basis of the electric power supplied from the vehicle power source. The vehicle further includes a high-voltage wire connected to the control unit, and a rear swing arm swingably supported on the vehicle body frame.

This arrangement allows for installation of the control unit and high-voltage wire on the rear swing arm. Further there is provided a wire-protecting member, individually separate from the rear swing arm, and a wire-protecting member arranged on the external side of the high-voltage wire. In the inventive structure, a high-voltage wire may be satisfactorily protected both by the rear swing arm and by the wire-protecting member. This allows for a design that would reduce the overall weight by an improved design of the rear swing arm.

According to a second aspect of the invention, a modified vehicle member also functions to protect the high-voltage wire. Therefore, according to the second aspect, it is no longer required to have a separate wire-protecting member as a result of having modified an existing member of the vehicle to protect the high-voltage wire. For example, when the vehicle is a motorcycle, a stand, which is usually provided to support the vehicle in the self-standing condition, can further be used to protect the high-voltage wire. This reduces both cost and weight by eliminating the generation of new components necessary to protect the high-voltage wire.

According to a third aspect of the invention, an arm of the stand protectively shields the high-voltage wire only when the vehicle is running. As a result, the stand arm protects the high-voltage wire by shielding the same when the vehicle is running, for example, when the stand is in a stored position thereof. Meanwhile, when the vehicle is not running, i.e., when the stand is in use, the arm is moved away from, and therefore does not cover the high-voltage wire, providing easy access to the high-voltage wire and the control unit. Accordingly, maintenance work on the high-voltage wire and control unit can be done more efficiently, while protection of the high-voltage wire can be improved.

According to a fourth aspect of the invention, the control unit is positioned such that the high-voltage wire is situated at the front of the rear swing arm. Therefore, heat generated by the control unit and high-voltage wire is efficiently radiated toward the external air. Therefore, the cooling efficiency of the control unit and high-voltage wire is enhanced.

Modes for carrying out the present invention are explained below by reference to an illustrative embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE PREFERRED EMBODIMENTS

Selected illustrative embodiments of the present invention will now be described, with reference to the drawings. Unless otherwise specified, the mention herein of right and left refer to those directions from a vantage point of a driver seated on the vehicle. Moreover, the arrow mark FR appearing in the figure indicates the front side of vehicle, while the arrow marks LH and UP indicate the left half and upper side of the vehicle, respectively.

Figure 1:
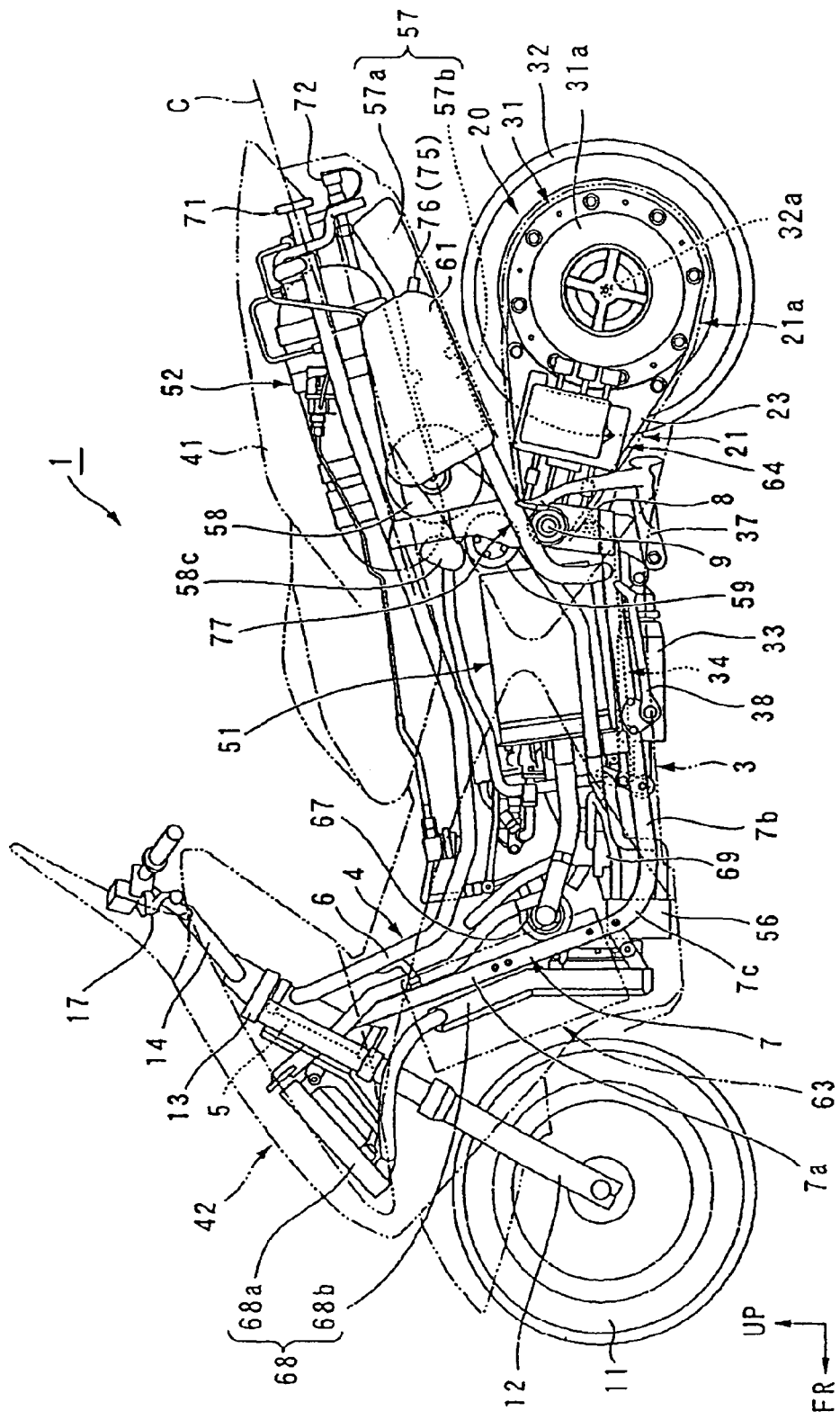
FIG. 1 is a left side plan view of an electric vehicle including an embodiment of the inventive high-voltage wire protecting apparatus.
Figure 2:
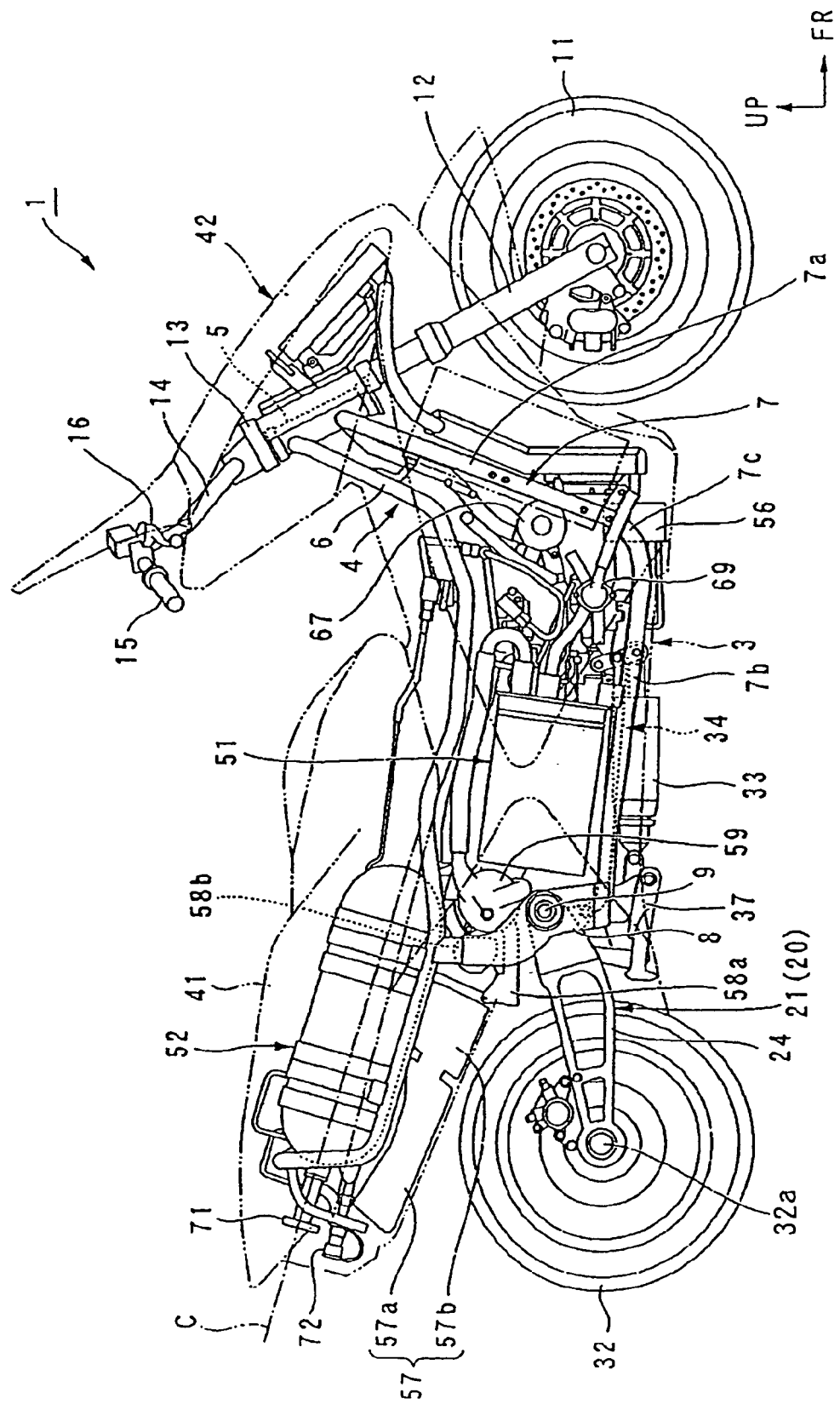
FIG. 2 is a right side plan view of the electric vehicle of FIG. 1, including an embodiment of the inventive high-voltage wire protecting apparatus.
Figure 3:
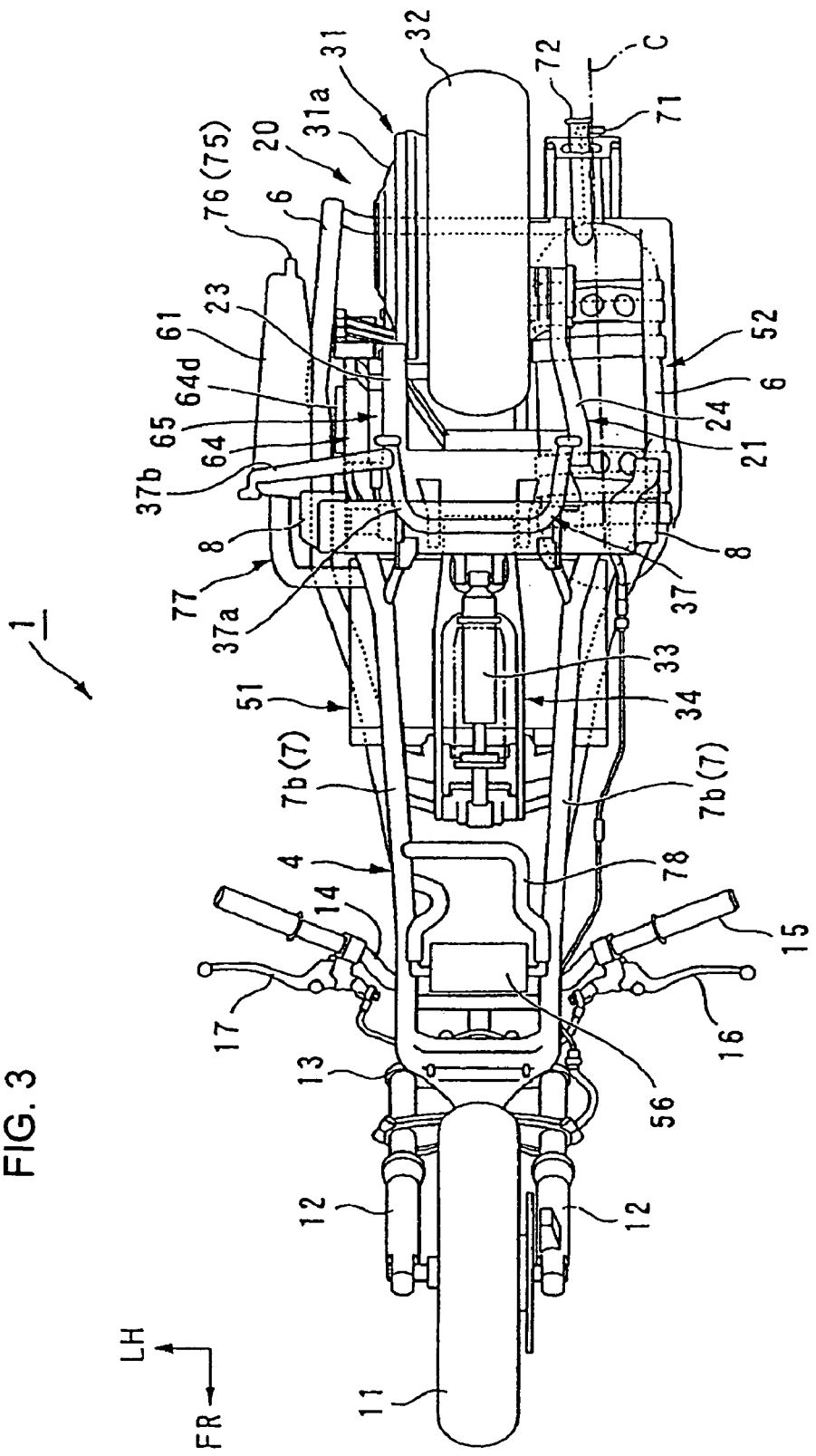
FIG. 3 is a top plan view of the electric vehicle including an embodiment of the inventive high-voltage wire protecting apparatus.

As shown in FIGS. 1 to 3, an electric vehicle 1 includes a driving motor 31, with electrical power supplied to the motor 31 from a fuel cell 51, mounted substantially centrally in the vehicle. Moreover, in the depicted embodiment, the electric vehicle 1 is a scooter-type vehicle having a lower floor portion 3 (hereinafter, referred to only as the floor). A rectangular parallelepiped (box-shaped) fuel cell 51 is arranged at an area of the vehicle near the floor 3. An in-wheel motor 31 is arranged within a rear wheel 32, in order to provide motive propulsion to drive the electric vehicle 1.

The in-wheel motor 31 is an integral unit, including a motor body and a reduction mechanism within a casing 31*a* thereof. This in-wheel motor 31 is mounted within the rear wheel 32, for example, from the left side, under the condition that an output shaft of the motor 31 is arranged coaxially with an axle 32*a* of the rear wheel.

The front wheel 11 of the electrical vehicle 1 is rotatably supported, at the center thereof, by a pair of right and left front supports 12, which cooperate with a steering stem 13 to form a front fork. An upper part of each front support 12 is also attached to the steering stem 13, which is pivotally attached to a head pipe 5 fixed on the front end of the vehicle body frame 4, in order to allow the electric vehicle 1 to be steered. A handlebar 14 is mounted at the upper end of the steering stem 13, and is usable to manually steer the front wheel 11. A throttle grip 15 is attached to the right grip portion of the handlebar 14, and rear and front brake levers 16, 17 are arranged on the front side of the right and left grips, respectively.

A pivot plate 8 extends in the upper and lower directions of the body at the rear part of the vehicle body frame 4, and the front end part of a rear swing arm 21 is pivotally supported thereon via the pivot shaft 9, so that the rear end portion thereof can swing reciprocally upward and downward. The rear swing arm 21 supports the casing 31*a* of the in-wheel motor 31, because a left arm body 23 of the rear swing arm 21 is extended up to the front end part of the in-wheel motor 31 and pivotally supports the axle 32*a* of the rear wheel, and because a right arm body 24 extends to the center position of the rear wheel 32. The motor unit 20 is formed mainly of the rear swing arm 21 and the in-wheel motor 31.

A rear shock absorber 33, extending substantially horizontally in the front and rear directions of the body, is arranged at lower part of the vehicle body frame 4, below the fuel cell 51. The rear end of the rear shock absorber 33 is coupled with the lower part of the body frame 4, and the front end of the rear shock absorber 33 is coupled to the lower part of the motor unit 20, specifically the rear swing arm 21. A link mechanism 34 causes the rear shock absorber 33 to move forward and backward as the rear swing arm 21 moves upwardly and downwardly with the motor unit 20. With this stroke of the rear shock absorber 33, impact and vibration are dampened or absorbed, rather than being inputted to the motor unit 20.

The vehicle body frame 4 includes an upper tube 6 which branches to the right and left from an upper part of a head pipe 5, extending diagonally toward the lower rear side of the vehicle, and also extending to the rear side of the vehicle after bending at a height almost equal to the middle of the body. A down tube 7, which branches to the right and left from a lower part of the head pipe 5 extending diagonally toward the lower read side of the vehicle and also extending to the rear side after bending near the bottom of the body. The rear end part of the upper tube 6 and the rear end part of the down tube 7 are coupled to the upper end part and lower end part, resepectively, of the pivot plate 8 located behind the fuel cell 51.

In the following description, the part of the down tube 7 which is bent is defined as the bending portion 7*c*, the part of the down tube 7 from the head pipe 5 to the bending portion 7*c* is defined as the front side part 7*a*, while the part from the bending portion 7*c* to the pivot plate 8 is defined as the lower side part 7*b*.

Each upper tube 6 extends toward the rear side from the pivot plate 8, until it reaches the rear end of the body. The rear half part of the upper tube 6 is used as a seat frame for supporting a seat 41 (shown in phantom in FIG. 1) for a rider.

The front end of the electric vehicle 1 is covered with a vehicle body cover 42, which may be formed of a synthetic resin (plastic) material. This vehicle body cover 42, which includes a windshield, has a part extending therefrom which forms a floor 3 (described above), in combination with the vehicle body frame 4. The main vehicle support stand 37, which also acts as a wire-protecting member, is pivotally mounted at a lower medial portion of the vehicle body frame 4, to support the vehicle body in the self-standing condition, when deployed. Alternatively, a side stand 38 is pivotally mounted at the lower left side of the vehicle body frame 4, to support the body in the self-standing condition with a certain inclination toward the left side, when the side stand is deployed.

Figure 4:
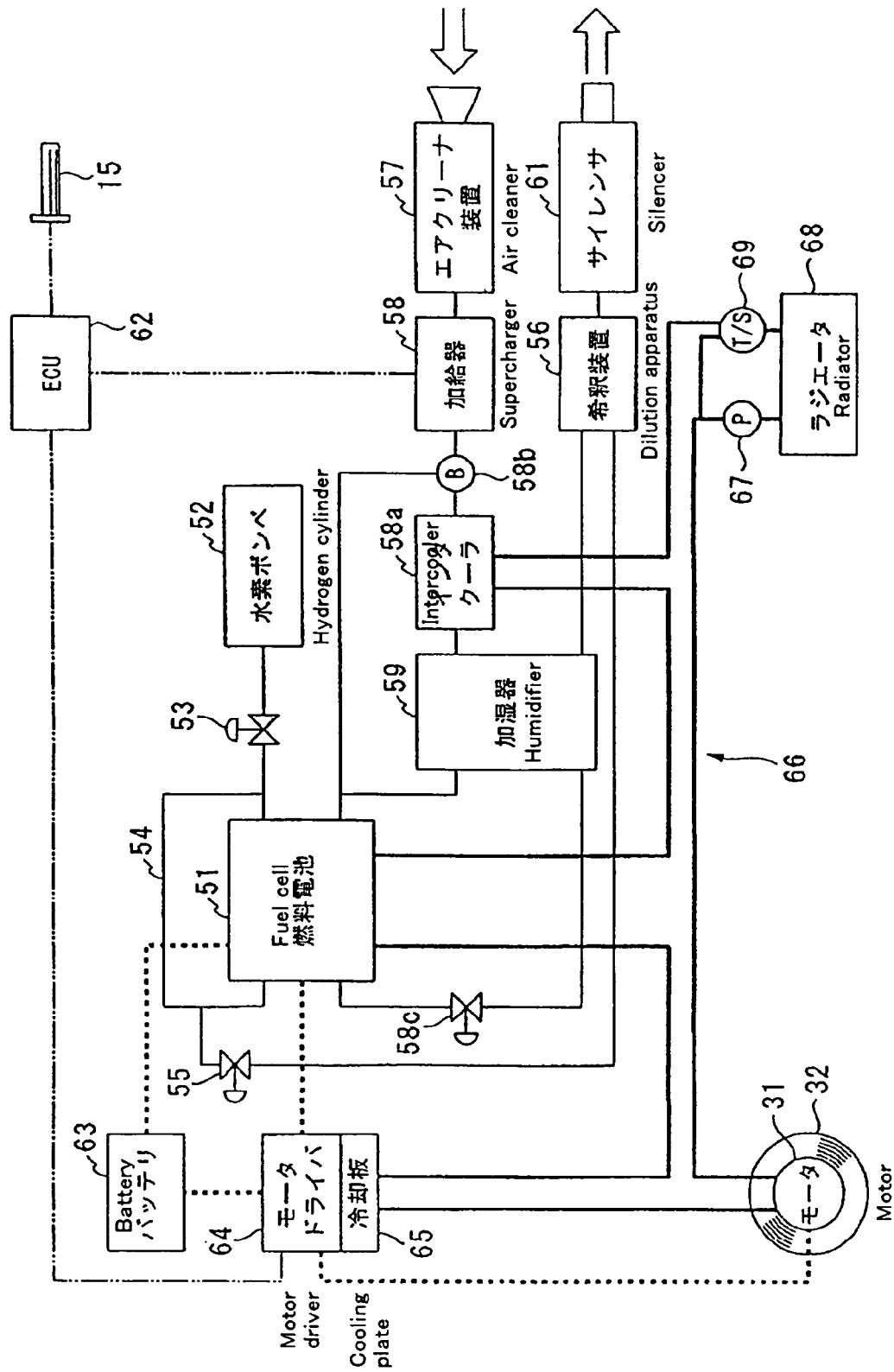
FIG. 4 is a schematic view of a fuel cell system in the electric vehicle of FIGS. 1-3.

Referring now to FIG. 4, the fuel cell 51 is a well-known polymer film type fuel cell (PEMFC), which is formed by laminating many layers of unit battery (unit cell) together. This fuel cell 51 supplies hydrogen gas as a fuel to the anode side of the battery, and also supplies air, which includes oxygen as the oxidation agent gas, to the cathode side of the battery. Hereinafter, the terms "air" and "oxidation agent gas" are used interchangeably. Accordingly, electric power is generated, along with water as a by-product, through an electrochemical reaction.

The hydrogen gas is supplied to the fuel cell 51 at a predetermined pressure via a shield valve 53 from the hydrogen cylinder 52, and is then guided, after it has been used for generation of electric power, to a hydrogen circulation path 54. In this hydrogen circulation path 54, hydrogen gas, which has not yet been used, is again supplied to the fuel cell 51, together with fresh hydrogen gas supplied from the hydrogen cylinder 52. The hydrogen gas circulating in the hydrogen circulation path 54 can be guided into a dilution device 56 via a purge valve 55.

Meanwhile, air is guided into a supercharger 58 via an air cleaner 57, is pressurized in the supercharger, and is thereafter supplied to the fuel cell 51 at a predetermined pressure. After the air has been used in the generation of electric power, the air is then guided into the dilution device 56. The reference numeral 58*a* designates an intercooler (air-to-air heat exchanger) for cooling the air supplied to the fuel cell 51. A humidifier 59 supplies humidity to the air and a bypass valve 58*b* supplies the air when the fuel cell 51 is in a low temperature condition. A back pressure valve 58*c* adjusts the pressure of the air in the fuel cell 51.

When the purge valve 55 provided in the hydrogen circulation path 54 opens, the hydrogen gas, after the reaction, is guided to the dilution device 56. In this dilution device 56, the hydrogen gas is mixed and diluted with the air exhausted from the fuel cell 51 and thereafter the combination of hydrogen and air is exhausted to the atmosphere via a silencer 61. The water generated by the fuel cell 51 is then guided to the humidifier 59 together with the exhausted air and to be then re-used as the water supplied to the oxidation agent gas. The water not integrated by the humidifier 59, for example, vapor, is exhausted, together with the reacted gas, through the dilution device 56.

Operation of the fuel cell 51 is controlled by an Electronic Control Unit (ECU) 62. More practically, the ECU 62 receives inputs of the pressures and temperatures of the hydrogen gas and the oxidation agent gas, the running velocity of vehicle, the number of rotations of the supercharger 58, and the temperature of the cooling water of the fuel cell 51. In accordance with each input, operations of the supercharger 58, the bypass valve 58b, the back pressure valve 58c, the purge valve 55, and the shield valve 53 or the like are controlled.

Moreover, the acceleration request signal from a throttle grip 15 is also inputted to the ECU 62, thereby controlling the drive of the in-wheel motor 31 for driving the rear wheel 32. The in-wheel motor 31 is a three-phase AC motor which is driven after the DC current from the battery (vehicle power source) 63 and the fuel cell 51 or secondary battery is converted into the three-phase AC current in a motor driver (control unit) 64, which is acting as an inverter unit.

The cooling system in the fuel cell system forms a cooling water path 66 for communication with each water path within the fuel cell 51, including the water jacket of the in-wheel motor 31, the inter-cooler 58a and a cooling plate 65 adjacent to the motor driver 64. This cooling system includes a water pump 67 and a radiator 68 in the cooling water path 66.

In this cooling system, the fuel cell 51, the motor 31, the oxidation agent gas and the motor driver 64 absorb the heat being radiated from the radiator 68 when the cooling water flows and circulates into the cooling water path 66 with the operation of the water pump 67. When the fuel cell 51 is in the low temperature condition, a thermostat 69 circulates the cooling water through the radiator 68.

Referring again to FIG. 1 through FIG. 3, the hydrogen cylinder 52 is formed as an ordinary high-pressure gas canister, having a cylindrical appearance and used as an ordinary composite vessel consisting of metal and fiber-reinforced plastic. This hydrogen cylinder 52 is allocated in the right side of the rear part of the body such that the axial line C thereof is located along the front and rear direction, more specifically, the axial line C is slightly lowered in the front side. In this case, the hydrogen cylinder 52 is located, at its right side (external side), slightly inside the upper tube 6 on the right side of the vehicle body. The left side (internal side) of the hydrogen cylinder 52 sits slightly outside of the rear wheel 32.

The front and rear end portions of the hydrogen cylinder 52 are formed spherically, in other words, the end parts are narrowed. The front end part thereof is located at the front end of the pivot plate 8 and the rear end part is located at the rear end part of the vehicle body. A main connector 71 and a hydrogen supply port 72 are arranged at the rear end part of the hydrogen cylinder 52.

The upper tube 6 in the left side of the vehicle body is extended almost linearly to the rear side inclined slightly such that the rear part becomes a little higher from the ground. Meanwhile, the upper tube 6 in the right side of the vehicle body gradually drops toward the rear side at the area roughly between the center of the fuel cell 51 and the pivot plate 8. The upper tube 6 in the right side of the body then runs at a slightly upward incline at the area near the pivot plate 8 toward the rear of the vehicle.

Moreover, the upper tube 6 in the right side of the body is provided, at its lower end, to almost overlap on the lower end part of the hydrogen cylinder 52, when viewed from the side surface of the vehicle body, bent upward at the rear end of the hydrogen cylinder 52, and extended toward the left side of the body avoiding the main connector 71 and hydrogen supply port 72 of the hydrogen cylinder 52. Thereafter, this upper tube 6 is then bent to the lower side and then coupled with the rear end part of the upper tube 6 in the left side of the body.

The fuel cell 51 is formed wide in the width direction of body and flat in the vertical direction of body. At the front wall part, a supply port and a discharge port of the oxidation agent gas and hydrogen gas are provided as well as an inlet port and an outlet port for the cooling water. At the upper rear side of the fuel cell 51, the humidifier 59 which includes a longer case in the width direction, is allocated closely. At the diagonally upper rear side of the left side of the humidifier 59, there is a supercharger 58. At the diagonally lower rear side of the supercharger 58, the left side part of an inlet duct 57b, extended in the width direction, is connected. Moreover, at the upper part of the left side part of the humidifier 59, the back pressure valve 58c is allocated closely.

The right side part of the inlet duct 57b is located in the lower side of the hydrogen cylinder 52 and is then connected to the front end part of the air-cleaner case 57a located at the lower side of the hydrogen cylinder 52. At the rear end part of the air-cleaner case 57a, an intake duct (not shown), is connected. These main members including the intake duct, the air-cleaner case 57a, and the inlet duct 57b form the air cleaner 57.

The bypass valve 58b is allocated at the rear part of the right side of the humidifier 59 and at the diagonally lower rear part of the bypass valve 58b, the inter-cooler 58a is allocated closely. The bypass valve 58b and inter-cooler 58a are allocated, in the front and rear side of the vehicle body, located between the right side part of the humidifier 59 and the right side part of the inlet duct 57b. The down-flow side of the supercharger 58 is connected to the inter-cooler 58a via the outlet duct, not illustrated.

On the left side of the rear part of the body, the silencer 61, which is flat in the width direction, is located on the outside of the upper tube 6 in the left side of the body. This silencer 61 is formed almost in a square shape when it is viewed from the side surface of the vehicle body and is arranged such that it is inclined with the rear part extended upward at the diagonally upper left side of the rear wheel 32. The silencer 61 is provided at the rear half part of a discharge pipe 77 inclined with the rear part extended upward. At the rear end part of this silencer 61 (discharge pipe 77), a tail pipe 75 projects toward the rear side and a discharge port 76 for the reacted gas is formed at the rear end part of this tail pipe 75.

The radiator 68 is divided into a comparatively small upper stage radiator 68a located in front of the head pipe 5 and a comparatively large lower stage radiator 68b located in front of the front side part 7a of each down tube 7. The water pump 67 is located at the right rear side of the lower stage radiator 68b, and the thermostat 69 is arranged at the diagonally lower rear side of the water pump 67. In addition, the battery 63 is positioned at the internal side of the vehicle body cover 42 located in both sides of the lower stage radiator 68b, which is flat in the width direction.

The dilution device 56 is allocated between the bending portion 7c of the down tube 7, such that it projects lower than lowest end of the lower side part 7b. From the dilution device 56, an exhaust short pipe 78 is guided out. This exhaust short pipe 78 is connected to the front side of the lower side part 7b of the down tube 7 on the left side of the vehicle body and the discharge pipe 77 is guided out from the rear side of the lower side part 7b. More specifically, the down tube 7 in the left side of the vehicle body forms a part of the exhaust path of the reacted gas. Accordingly, the exhaust gas from the dilution device 56 is released to the atmosphere via the exhaust short pipe 78, the lower side part of the down tube 7, and the discharge pipe 77.

Figure 5:
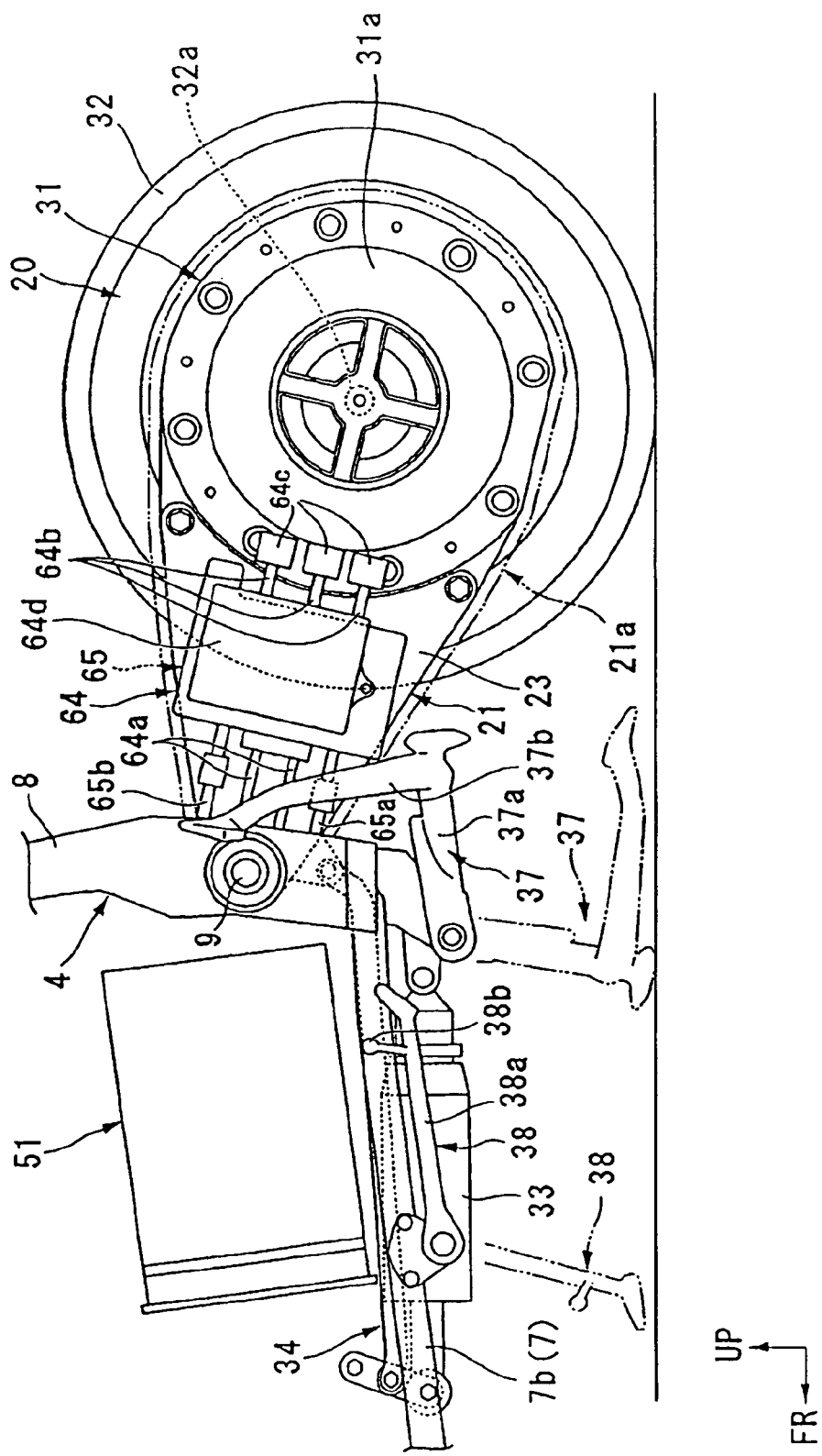
FIG. 5 is an enlarged detail elevational view of the lower rear portion of the electric vehicle of FIG. 1, showing the essential portions of the inventive high-voltage wire protecting apparatus.

Referring to FIG. 5, the motor driver 64 is formed almost in a square shape when it is viewed from the side surface of the vehicle body. The motor driver 64 is mounted, via the cooling plate 65, on the external side of the vehicle body of a left arm body 23 of a rear swing arm 21. At the front end part of the motor driver 64, a high-voltage wire 64a is connected for supplying the electric power from the fuel cell 51 and battery 63. Moreover, at the front end of the cooling plate 65, a water supply pipe 65a and discharge pipe 65b are respectively connected forming part of the cooling water path 66.

A three-phase high-voltage wire 64b is guided from the rear end part of the motor driver 64 and the high-voltage wire 64b of each phase is then connected to a feed terminal at the front end part of the in-wheel motor 31. Preferably, the motor driver 64 is allocated closely to the in-wheel motor 31 as to not result in the wires covering around themselves or each other. A current sensor 64c detects the amount of power supplied to the in-wheel motor 31 provided for the high-voltage wire 64b of each phase. Also, a voltage smoothing capacitor 64d is a part of the motor driver 64.

A swing arm cover 21a, as a part of the rear swing arm 21, is mounted to the motor unit 20. This swing arm cover 21a surrounds, together with the rear swing arm 21 and motor 31 the following elements in order to protect them: the motor driver 64, the cooling plate 65, the voltage smoothing capacitor 64d, the high-voltage wires 64a, 64b, the water supply pipe 56a, the discharge pipe 65b, and the current sensor 64c or the like. The swing arm cover 21a is provided with an external air inlet port and outlet port (not shown), for circulating the external air at the inside thereof.

Figure 6:
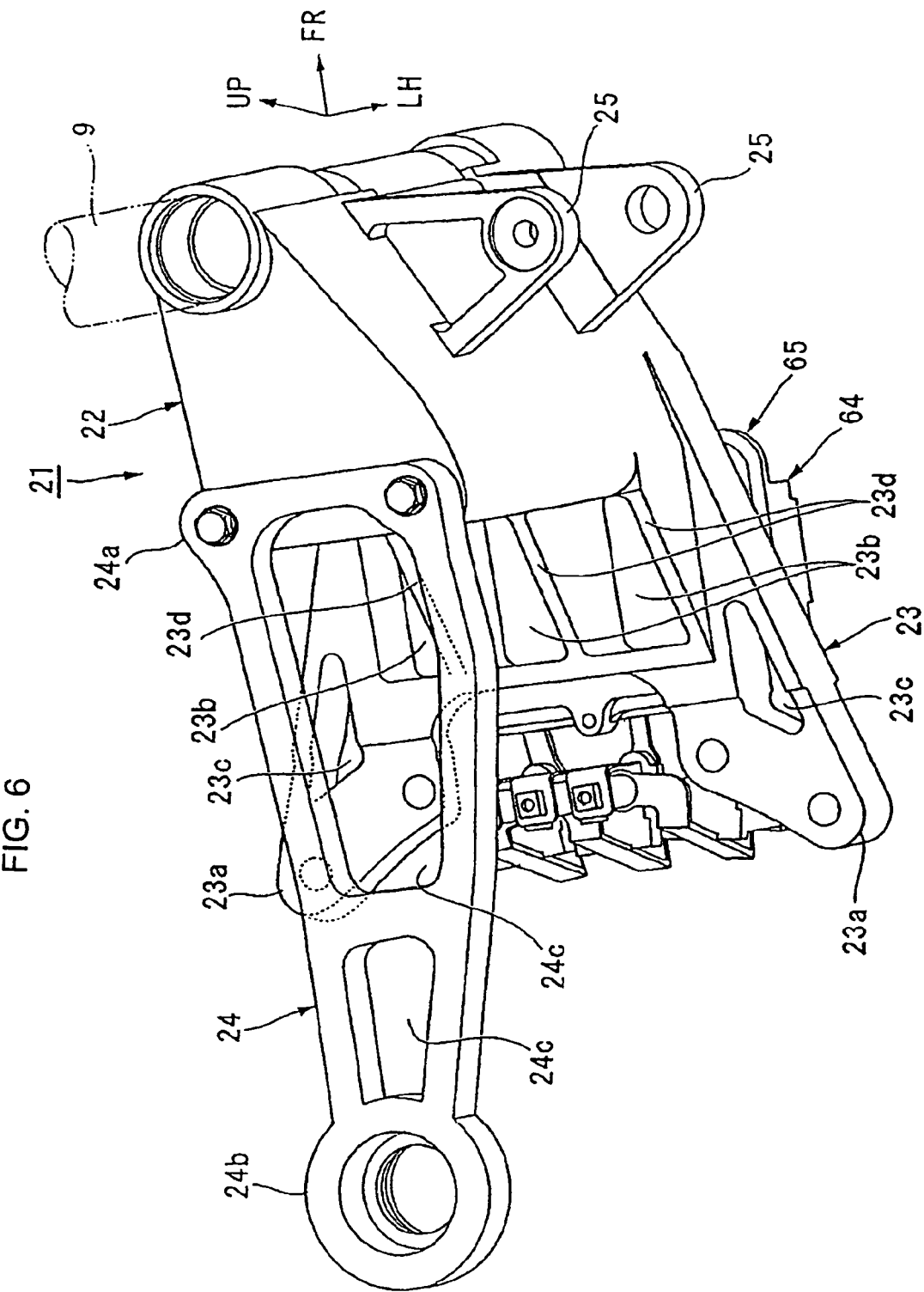
FIG. 6 is a perspective view of a rear swing arm which is a component of the electric vehicle of FIGS. 1-3, with the swing arm viewed from the lower right side.

As illustrated in FIG. 6, the rear swing arm 21 is formed almost like a triangular prism in which the base part 22 is provided along the width of vehicle body. In such a rear swing arm 21, a pivot axis 9 is provided, again along the width of the body, through the top part located in the front end side of the base part 22. Simultaneously, the rear swing arm 21 is supported by the pivot plate 8 via the pivot axis 9. The base part of the rear swing arm 21 is formed of an aluminum alloy and a left arm body 23 is integrated at the left side thereof. The left arm body 23 becomes wider as it goes to the rear side for the continuation of the base part 22.

The left arm body 23 runs almost along the side surface of vehicle body. The rear end upper part and lower part 23a thereof are coupled with the front end, upper and lower part of the casing 31a of the in-wheel motor 31. The coupling portion 23a and casing 31a are integrally coupled using a bolt. Almost at the center of the left arm body 23, a center thinning hole 23b of the three stages is provided in the vertical direction almost in a square shape and at the position located in the rear side of the coupling portion 23a a rear thinning hole 23c is provided almost in the triangular shape. At the rear surface side (internal side in the width direction of the vehicle body) of the left arm body 23, plural triangular ribs 23d extend to the left arm body 23 and base part 22.

On the right side of the base part 22 of the rear swing arm 21, a front end part 24a of a right arm body 24 is integrally connected, using a bolt or the like. The right arm body 24 is also formed of an aluminum alloy and is provided in opposition to the left arm body 23. The right arm body 24 is extended and becomes slightly narrow as it goes to the rear side from the right side of the base part 22. At the rear end part thereof, a supporting part 24b of the rear wheel 32 is provided. Moreover, the right arm body 24 is formed almost in the shape of a quadrilateral when viewed from the side surface of the vehicle body, because a large thinning hole 24c is respectively formed in each of the front and rear portions thereof.

Figure 7:
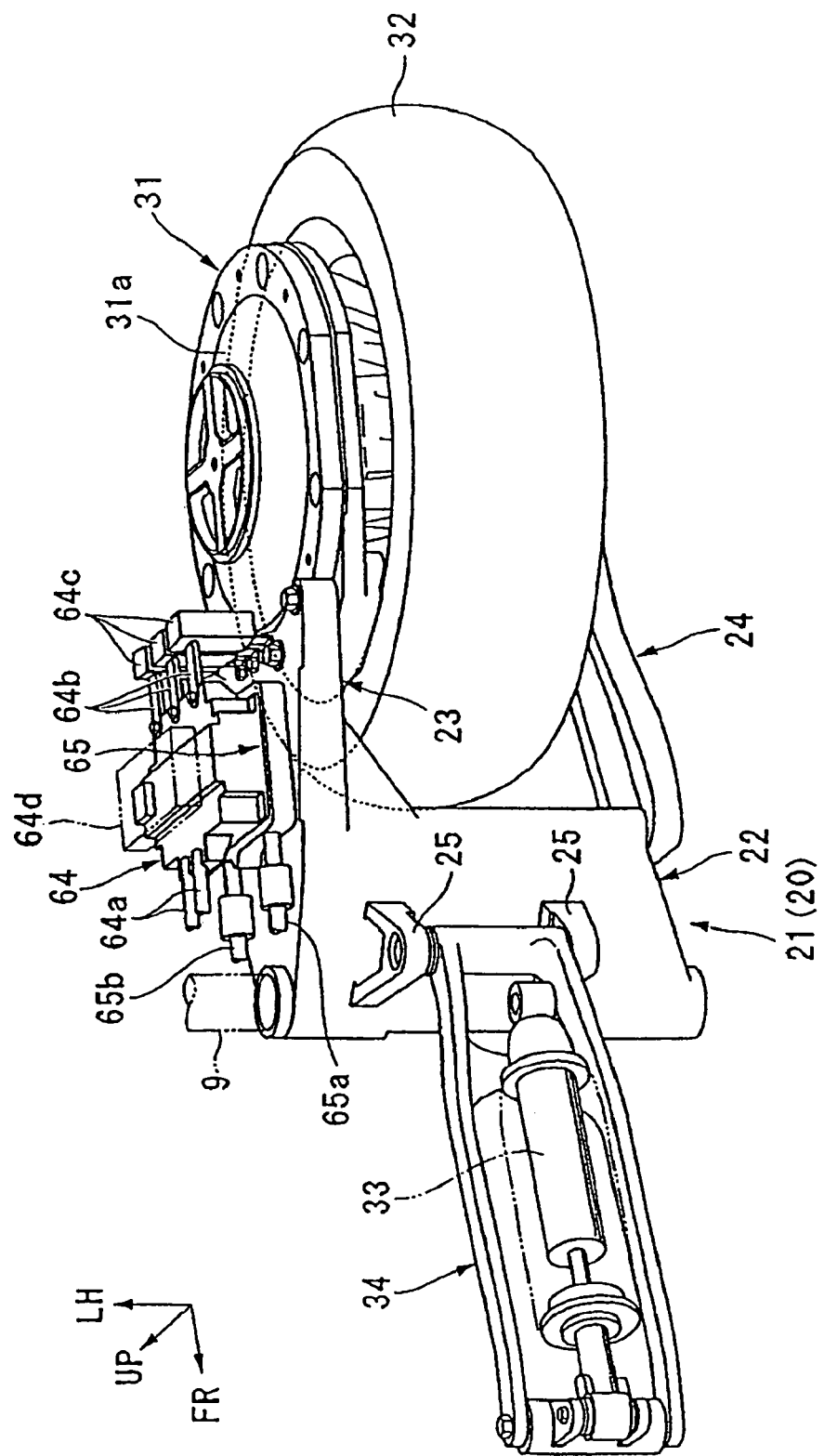
FIG. 7 is a perspective view of the peripheral part of a motor unit and rear wheel of the electric vehicle of FIGS. 1-3, viewed from the lower left side.

Referring to FIG. 7, at the external side surface of the left arm body 23 of the rear swing arm 21, the cooling plate 65, almost in a square shape when viewed from the side surface of the vehicle body, is mounted to close the center thinning hole 23b. The cooling plate 65 is arranged, on its internal side surface, adjacently to the external side surface of the left arm body 23 through contact therewith. Mounted at the external side of the cooling plate 65 is the almost rectangular parallelepiped motor driver 64, which virtually overlaps the cooling plate when viewed from the side surface of the vehicle body.

Since the motor driver 64 is arranged, on its internal surface, adjacently to the external surface of the cooling plate 65 through contact therewith, cooling by this cooling plate becomes possible. Moreover, the voltage smoothing capacitor 64d contacts, on its internal surface, the external surface of the motor driver 64 and also faces the external surface of the vehicle body with its external surface. The reference numeral 25 denotes the lower mount for coupling of one end side of a link mechanism 34.

Figure 8:
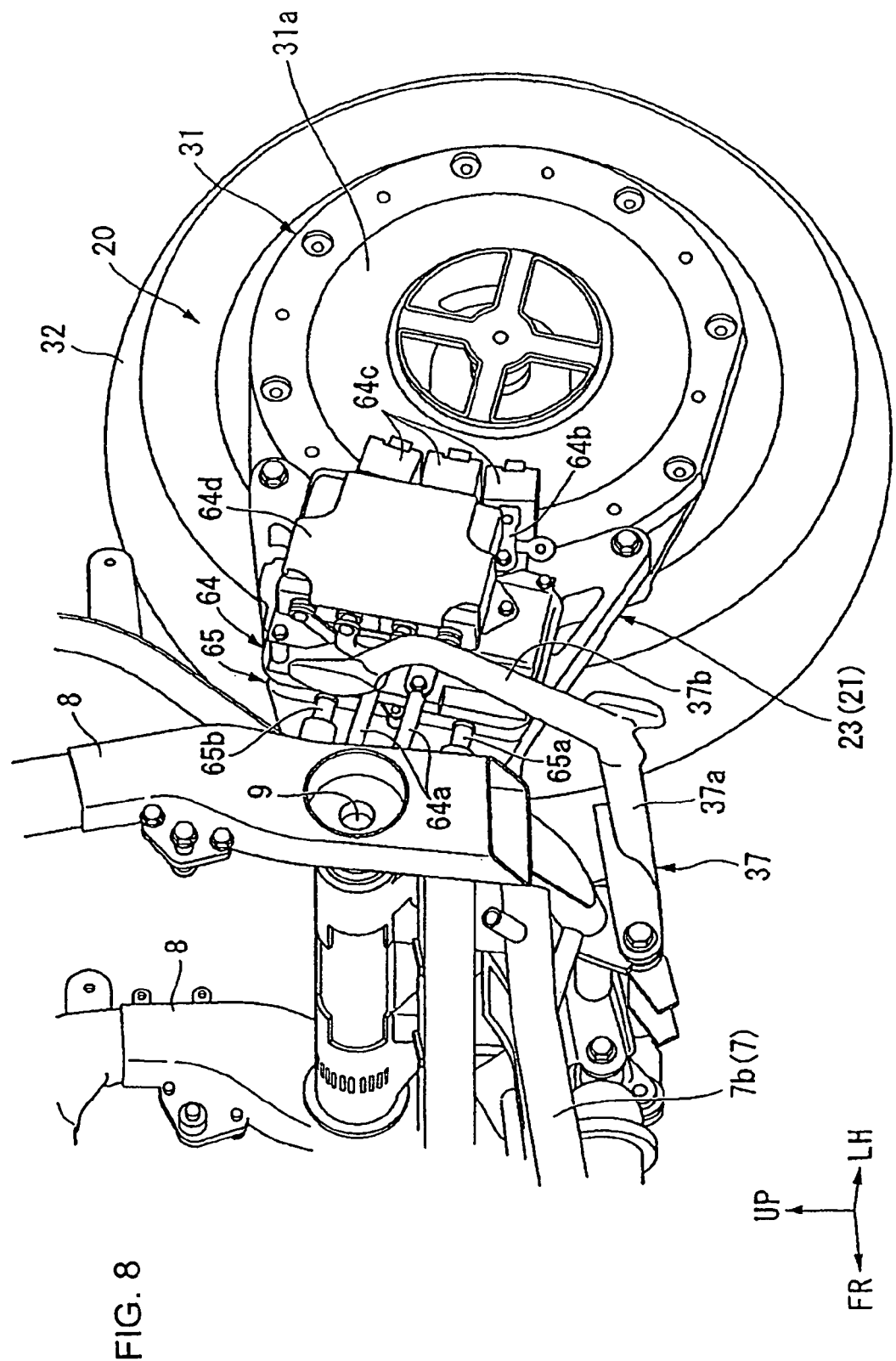
FIG. 8 is another perspective view of the peripheral part of the motor unit and rear wheel of FIG. 7, viewed from the front left side.

Here, as illustrated in FIG. 3, FIG. 5 and FIG. 8, the stand body 37a of the main vehicle support stand 37 is formed, for example, by forming a metal pipe, such as steel or the like, into the approximate shape of a gate, when viewed from the lower surface of the vehicle body. Also, the upper side part of the stand body 37a is operatively pivotally connected to the vehicle frame adjacent the lower end part of the pivot plate 8, allowing the stand body 37a to freely swing around a pivot axis along the width direction of vehicle body. The main vehicle support stand 37 also includes a guard arm 37b, integrally formed with the stand body 37a and extending substantially transversely therefrom, as shown. The guard arm 37b has a dual use, functioning as an actuation lever for the support stand 37, and also as a protective shield for the high-voltage wiring 64a when the stand is in the stored position thereof, as will be further discussed herein.

The main vehicle support stand 37 can be set to an deployed, in-use position, such that the stand will support the vehicle body in a self-standing state, when the stand is swung toward the ground so that both lower ends of the stand body 37a are grounded (this position is shown by the dashed-line main vehicle support stand 37 in FIG. 5). The main vehicle support stand 37 can also be set to a stored, non-use position, wherein both lower ends of the stand body 37a are swung away from the ground, and back toward the rear of the electric vehicle 1 (this position is shown by the solid-line main vehicle support stand 37 in FIG. 5). The main vehicle support stand 37 is energized with a return spring (not shown), so that it can maintain the stored position during normal operation of the vehicle.

The vehicle is also provided with a side stand 38, as previously noted. The side stand 38 includes a stand body 38a which may be formed, for example, from a steel pipe or a strong alloy material. One end thereof is mounted to the lower part of the down tube, 7 on the left side of the vehicle body, to freely swing around the axis at a slight inclination toward the upper left side in the width direction of vehicle body. Such side stand 38 can be set to the deployed, in-use position (this position is shown by the dashed-line side stand 38 in FIG. 5) to support the vehicle body in an upright position slightly tilted toward the left side. The side stand 38 can also be set to a stored, non-use position, namely to the storing condition when the other end is swung away from the ground and back toward the rear side of the electric vehicle 1. Like the main vehicle support stand 37, the side stand 38 is also energized with a return spring (not shown), to maintain the stand in the stored position.

The guard arm 37b, which can be contacted by a user's foot to manipulate the main vehicle support stand 37, is integrally attached to the left side part of the stand body 37a of the main vehicle support stand 37. When the main vehicle support stand 37 is in the non-use/stored position, the guard arm 37b is extended from the left side part of the stand body 37a toward the upper external side of the vehicle body, at a slight forward inclination. The outer tip of the guard arm 37b is formed as the pedal part in order for a user to manipulate the main vehicle support stand 37 with the tip of his or her foot.

In the stored position of the main vehicle support stand 37, the guard arm 37b protects the high-voltage wire 64a, connected to the front end part of the motor driver 64, by overlapping and protectively shielding the high-voltage wire 64a when viewed from the side of the vehicle body, as shown. The guard arm 37b also protects the water supply pipe 65a and water discharge pipe 65b, connected to the front end part of the cooling plate 65, when the main vehicle support stand 37 is in the stored position thereof.

Further, as previously noted, the swing arm cover 21a is provided to protectively cover the rear swing arm 21, and the high-voltage wire 64a, the water supply pipe 65a and the water discharge pipe 65b, closely located along the external side surface of the left arm body 23, are protectively covered by the swing arm cover 21a, in addition to being well protected by the guard arm 37b of the main vehicle support stand 37, when the main vehicle support stand 37 is in the stored condition.

According to this embodiment of the present invention, when the main vehicle support stand 37 is set to the deployed, in-use position, the guard arm 37b does not shield the high-voltage wire 64a, the water supply pipe 65a or the water discharge pipe 65b.

As shown in FIG. 5, the stand body 38a of the side stand 38 is also provided with a short integrated actuator arm 38b, in a manner similar to the main vehicle support stand 37.

As explained above, the high-voltage wire protecting mechanism of the electric vehicle 1 in this embodiment is provided with the in-wheel motor 31 as the drive source of the vehicle, the fuel cell 51 and battery 63 to supply the electric power to the in-wheel motor 31, and the motor driver 64 for controlling the drive of the in-wheel motor 31 on the basis of the electric power supplied from the fuel cell and battery. This protecting mechanism is also provided with the high-voltage wire 64a connected to the motor driver 64, and the rear swing arm 21 supported to freely swing for the vehicle body frame 4.

In this protecting mechanism, the rear swing arm 21 is provided with the motor driver 64 and high-voltage wire 64a. The guard arm 37b of the main vehicle support stand 37 is arranged at the external side of the high-voltage wire 64a such that the main vehicle support stand 37 also protects the high-voltage wire 64a as the wire-protecting member separately formed from the rear swing arm 21.

According to this embodiment, the high-voltage wire 64a may be well protected with both the swing arm cover 21a of the rear swing arm 21, and the guard arm 37b of the main vehicle support stand 37. Therefore, protection of the high-voltage wire 64a can further be improved, while the weight of the rear swing arm 21 can be reduced through a sensible design.

In addition, it is no longer required to prepare separate new components as the wire-protecting member. Thus, both cost and weight can be reduced by protecting the high-voltage wire 64a using the main vehicle support stand 37 as an existing member of the vehicle, since a new component no longer needs to be added to the vehicle.

According to a second advantageous feature of the present invention, when the electric vehicle 1 is running, namely when the main vehicle support stand 37 is in the non-use/stored position, the guard arm 37b shields the high-voltage wire 64a for protection purposes. Meanwhile, when the electric vehicle 1 is not running, namely when the main vehicle support stand 37 is in the deployed, in-use position, the guard arm 37b does not cover the high-voltage wire 64a. As a result, the high-voltage wire 64a and motor driver 64 can be accessed easily, thus allowing for ease of maintenance. In other words, while the protection property of the high-voltage wire 64a can be improved, the maintenance ability of the high-voltage wire 64a and motor driver 64 can also be improved.

According to a third advantageous feature of the present invention, the motor driver 64 and high-voltage wire 64a of the high-voltage wire protecting mechanism are arranged facing the external side of the rear swing arm 21. Accordingly, since heat generated by the motor driver 64 and high-voltage wire 64a is radiated to the external atmosphere, the cooling effect of the motor driver 64 and high-voltage wire 64a can be enhanced.

The present invention is not limited to the embodiments explained above. For example, it is possible that the guard arm 37b of the main vehicle support stand shields the high-voltage wire 64b of each phase, connected to the rear end part of the motor driver 64, to protect the wire. In addition, the high-voltage wires 64a, 64b of each phase can also be protected by the arm 38b of the side stand 38.

While a working example of the present invention has been described above, the present invention is not limited to the working example described above, but various design alterations may be carried out without departing from the spirit and scope of the present invention as set forth in the claims.

What is claimed is:

1. In an electric vehicle of the type having:
    a vehicle body frame;
    a electric motor for propelling the vehicle;
    a vehicle electric power source for supplying electric power to the motor;
    a control unit for controlling the drive of the electric motor on the basis of the electric power supplied from the vehicle power source;
    a high-voltage wire connected to and disposed outside of the control unit;
    and a rear swing arm attached to the vehicle body frame; wherein the improvement comprises:
    the rear swing arm being provided with the control unit and the high-voltage wire operatively mounted on an outwardly facing side surface thereof; and
    a wire protection member which is independent of the rear swing arm, and which is arranged outboard of the high-voltage wire, the wire protection member comprising a wire-overlapping portion which is operable to overlap and protectively shield the high-voltage wire, when viewed from a side of the vehicle.

2. The improved electric vehicle according to claim 1, wherein the vehicle electric power source comprises a fuel cell, and wherein the wire protection member is a vehicle component which has a separate function besides protecting the wire.

3. The improved electric vehicle according to claim 2, wherein the wire protection member is integrally formed with a support stand provided to temporarily keep the electric vehicle in an upright position when the vehicle is not in use.

4. The improved electric vehicle according to claim 3, wherein the support stand can be pivotally moved between a deployed position and a stored position, and wherein the support stand comprises a guard arm which shields the high-voltage wire only when the support stand is in the stored position thereof.

5. The improved electric vehicle according to claim 1, wherein the control unit and high-voltage wire are disposed on a front end portion of the rear swing arm.

6. The improved electric vehicle according to claim 1, wherein the control unit is provided with a cooling plate having a water-cooled heat exchanger operatively associated therewith, with a water supply pipe and a water discharge pipe extending from the heat exchanger adjacent the high-voltage wire.

7. The improved electric vehicle according to claim 6, wherein the wire protection member is integrally formed with a support stand provided to temporarily keep the electric vehicle in an upright position when the vehicle is not in use, the support stand being pivotally movable between a deployed position and a stored position thereof,
and wherein the support stand comprises a guard arm which protectively shields the high-voltage wire, the water supply pipe and the water discharge pipe when the support stand is in the stored position thereof.

8. The improved electric vehicle according to claim 1, further comprising a swing arm cover operatively attached to the swing arm for protectively covering the control unit and the high-voltage wire.

9. An electric vehicle, comprising:
a vehicle body frame;
a rear swing arm pivotally attached to the frame;
an electric motor operatively connected to the frame for use in propelling the vehicle;
an electric power source for supplying electric power to the electric motor;
a control unit for controlling operation of the motor, said control unit operatively attached to an outwardly facing side surface of the rear swing arm;
a high-voltage wire connected to the control unit and disposed on the outwardly facing side surface of the rear swing arm outside of the control unit;
and
a wire protection member which is separate from the rear swing arm,
wherein the wire protection member is arranged outboard of the high-voltage wire, the wire protection member comprising a wire-overlapping portion which is operable to overlap and protectively shield the high-voltage wire, when viewed from a side of the vehicle.

10. The electric vehicle according to claim 9, wherein the vehicle electric power source comprises a fuel cell, and wherein the wire protection member has an additional function besides protecting the wire.

11. The electric vehicle according to claim 10, wherein the wire protection member is integrally formed with a support stand provided to temporarily keep the electric vehicle in an upright position when the vehicle is not in use.

12. The electric vehicle according to claim 11, wherein the support stand can be pivotally moved between a deployed position and a stored position, and wherein the support stand comprises a guard arm which shields the high-voltage wire only when the support stand is in the stored position thereof.

13. The improved electric vehicle according to claim 9, wherein the wire protection member is integrally formed with a support stand provided to temporarily keep the electric vehicle in an upright position when the vehicle is not in use, the support stand being pivotally movable between a deployed position and a stored position thereof,
wherein the control unit is provided with a cooling plate having a water-cooled heat exchanger operatively associated therewith, with a water supply pipe and a water discharge pipe extending from the heat exchanger adjacent the high-voltage wire,
and wherein the support stand comprises a guard arm which protectively shields the high-voltage wire, the water supply pipe and the water discharge pipe when the support stand is in the stored position thereof.

14. The improved electric vehicle according to claim 9, further comprising a swing arm cover operatively attached to the swing arm for protectively covering the control unit and the high-voltage wire.

15. An electric vehicle, comprising:
a vehicle body frame;
a rear swing arm pivotally attached to the frame;
an electric motor operatively connected to the frame for use in propelling the vehicle;
an electric power source for supplying electric power to the electric motor;
a control unit for controlling operation of the motor, said control unit operatively attached to an outwardly facing side surface of the rear swing arm;
a high-voltage wire connected to the control unit and disposed on the outwardly facing side surface of the rear swing arm outside of the control unit;
and
a wire protection member which is separate from the rear swing arm and which is arranged outboard of the high-voltage wire, the wire protection member comprising a wire-overlapping portion which is operable to overlap and protectively shield the high-voltage wire, when viewed from a side of the vehicle;
wherein the wire protection member is integrally formed with a support stand provided to temporarily keep the electric vehicle in an upright position when the vehicle is not in use, the support stand being pivotally movable between a deployed position and a stored position, and wherein the wire-overlapping portion comprises a guard arm which shields the high-voltage wire only when the support stand is in the stored position thereof.

16. The electric vehicle according to claim 15, wherein the control unit and high-voltage wire are disposed on a front end portion of the rear swing arm.

17. The electric vehicle according to claim 15, wherein the control unit is provided with a cooling plate having a water-cooled heat exchanger operatively associated therewith, with a water supply pipe and a water discharge pipe extending from the heat exchanger adjacent the high-voltage wire.

18. The electric vehicle according to claim 17, wherein the guard arm protectively shields the high-voltage wire, the water supply pipe and the water discharge pipe when the support stand is in the stored position thereof.

19. The electric vehicle according to claim 15, further comprising a swing arm cover operatively attached to the swing arm for protectively covering the control unit and the high-voltage wire.

20. The electric vehicle of claim 15, wherein the vehicle electric power source comprises a fuel cell.

* * * * *